Aug. 5, 1952 D. MACKEY 2,606,250

FREQUENCY DISCRIMINATOR NETWORK

Filed March 29, 1947

INVENTOR
DONALD MACKEY.
BY H. S. Grover
ATTORNEY

Patented Aug. 5, 1952 2,606,250

UNITED STATES PATENT OFFICE 2,606,250

FREQUENCY DISCRIMINATOR NETWORK

Donald Mackey, Haddon Heights, N. J., assignor to Radio Corporation of America, a corporation of Delaware Application March 29, 1947, Serial No. 738,056

3 Claims. (Cl. 178—44)

My present invention relates generally to a novel and improved discrimination input circuit for detectors of angle modulated carrier waves, and more particularly to an improved "ratio detector" circuit for deriving the modulation signal from a frequency modulated (FM) carrier wave without allowing co-existent amplitude modulation (AM) variations to result in substantial detector output potentials.

It is an important object of my present invention to provide a frequency discriminator input circuit for a detector of angle modulated carrier waves, the input circuit comprising cascaded resonant circuits employing a novel coupling construction at the final circuit to provide the required pair of detector input voltages whose relative magnitudes are a function of the angle modulation.

It is another important object of my invention to provide a ratio detector for FM signals of the type disclosed by S. W. Seeley in application Serial No. 614.956, filed September 7, 1945, now Patent 2,497,841 issued on February 14, 1950, the detector being constructed to permit the use of cascaded resonant input circuits, iron cores being employed for adjusting the respective inductances of the input circuits, and an iron core being utilized to adjust the electrical center of the tapped final resonant circuit to provide a symmetrical response.

A specific object of my invention is to provide a novel method of coupling a pair of shielded resonant circuits whereby there are developed at opposite sides of an electrical center of the second circuit respective high frequency voltages, each of the latter being the resultant of applied high frequency voltages in phase quadrature relation.

More specific objects of my invention will appear in the following detailed description of an embodiment, it being pointed out that my present balanced FM detector system, substantially immune to AM effects, has particular applicability to FM receiver construction.

Other objects and features of the invention will best be understood by reference to the following description, taken in connection with the drawing, in which I have indicated digrammatically circuits whereby my invention may be carried into effect.

Figures 1, 2, 3:
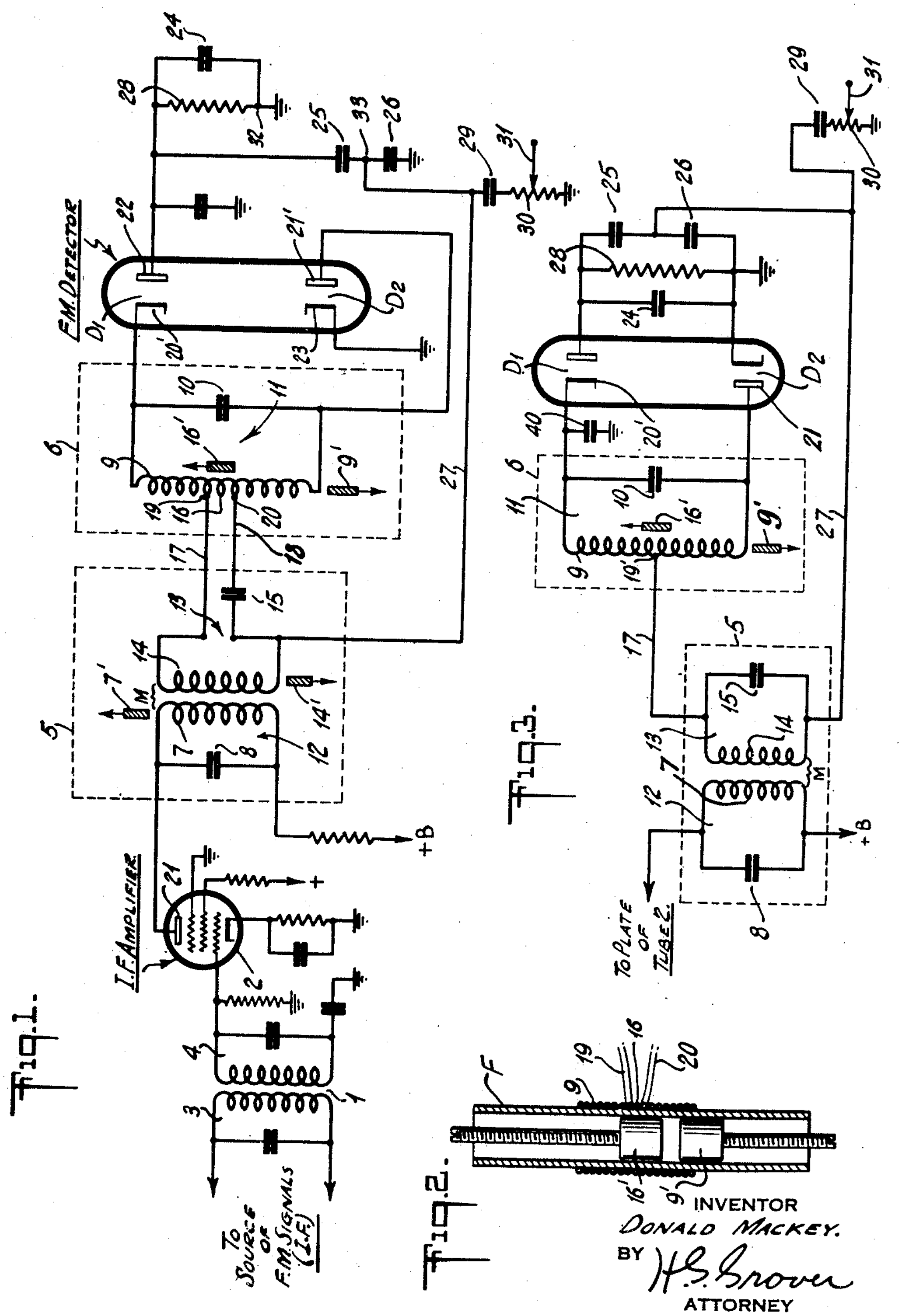
Fig. 1 shows an embodiment of my present invention.
Fig. 2 shows a section through the input coil form of the rectifiers.
Fig. 3 illustrates a modification of the circuit of Fig. 1.

Referring now to the accompanying drawing, wherein like reference numerals in the figures denote similar circuit elements, there is shown in Fig. 1 a detector network of an FM receiver of the superheterodyne type. The detector input circuit is constructed in accordance with my present invention. While my invention is readily incorporated in any form of receiver of FM waves, I prefer to explain its functioning in connection with a superheterodyne receiver since such a system is widely used at the present time. As previously explained, the present invention is not restricted to reception of FM waves, since phase modulation carrier waves could be received as well. An FM wave is produced at the FM transmitter by deviating the carrier wave relative to its mean frequency to an extent proportional to the amplitude of the modulation signal and independent of the frequency of the modulating signal. A PM wave differs in having a frequency deviation which increases with the frequency of the modulation signal. The generic expression, "angle modulation" is, also, intended to include a modulated wave of preferably constant amplitude wherein the modulation is neither pure FM nor pure PM, but contains components resembling one or both of them, and is, therefore, a hybrid modulation.

In the present application it is assumed, by way of specific example, that the receiver is designed to operate in the FM broadcast band of 88–108 megacycles (mc.), and that each transmitter radiates an FM wave having a maximum frequency deviation up to ±75 kilocycles (kc.) with respect to the normal transmitter frequency. These are the assigned frequency values of the present FM broadcast band, and are used herein merely by way of illustration. The receiver may include any desired form of signal collector, as for example a dipole. The collected FM signal waves may be applied to a suitable converter for reduction of the mean frequency value without change of the deviations. The converter may be of any desired construction, and is preferably preceded by one or more stages of selective radio frequency amplification. Suitable signal selector circuits, usually employing a variable condenser or adjustable inductor, are employed for adjustment to receive signals from a desired FM station. The signal selector circuits will, of course, preferably be adjusted to resonate the various adjustable selector circuits to the center or means frequency of the desired FM station.

In a superheterodyne receiver, as is well known, the converter is fed with oscillations from a local oscillator whose tank circuit includes an adjustable reactance device, usually a variable condenser or adjustable inductor. The latter is customarily adjusted concurrently with the aforesaid signal selector devices so that the tank circuit will be tuned to a local oscillation frequency differing from the desired carrier frequency by the operating intermediate frequency (I. F.). The selective circuits of, and preceding, the converter may on the other hand be of the fixedly tuned type, if desired. The intermediate frequency is usually chosen from a range of 2 to 15 mc., by way of example 10.7 mc. Any suitable actuating mechanism may be used for operating the station selecting devices. The converter may use the well-known pentagrid tube, or it may use separate oscillator and mixer tubes. These various circuits and circuit components are very well known to those skilled in the art of radio communication, and need only be briefly referred to.

The I. F. amplifier network may embody one or more amplifier tubes selectively tuned to the operating I. F. value of 10.7 mc. Of course, all signal transmission circuits between the signal collector and the demodulator or detector will be so constructed as to pass efficiently a band at least 150 kc. wide. It is, also, usual to design the signal transmission circuits to have a pass band of approximately 200 kc. in width to provide for reasonable tolerances, such as oscillator frequency drift and the like. The transformer 1 feeding the final I. F. amplifier tube 2 has its primary and secondary circuits 3, 4 each tuned to the operating I. F. value.

One of the reasons in the past for employing an amplitude limiter prior to the discriminator section (or FM translating network) of the demodulator to reduce undesired AM effects on the carrier wave, was to avoid the necessity for critical tuning to the exact center, or carrier, frequency of a desired FM wave. As explained in the aforesaid Seeley application, in the present detector system there need be no special amplitude limiter stage employed prior to the detector circuit, since the detector itself is substantially immune to amplitude variations of the received FM signals. Hence, the I. F. amplifier tube 2 immediately preceding the detector circuit may possess normal and full gain, which is the reverse of the usual operating condition for an amplitude limiter.

The discriminator input circuit of the present FM detector comprises the shielded networks shown in dotted rectangles denoted by numerals 5 and 6 respectively. The input coil 7 is indicated as part of the primary circuit. The discriminator input network is utilized to provide the energizing signal voltages for rectifiers $D_1$ and $D_2$. In general, it is desired to employ a network constructed and arranged to derive from the angle modulated waves at coil 7 a pair of voltages whose relative amplitudes vary in accordance with the angular deviations of the waves with respect to a predetermined reference condition (whether phase or frequency).

Considering the specific illustrative embodiment, coil 7 is shunted by condenser 8 to provide a parallel resonant circuit tuned to the operating I. F. The tertiary coil 9 is shunted by condenser 10. The resonant tertiary circuit 11, including coil 9 and condenser 10, is tuned to substantially the resonant frequency of the primary circuit 12. Each of coils 7 and 9 is of the known inductance trimmer type. Specifically, powdered iron cores or slugs are used for adjusting the inductance values of the respective coils 7 and 9.

The secondary resonant circuit 13 consists of coil 14 inductively coupled, as at M, to primary coil 7. The secondary coil 14 is effectively shunted by its condenser 15 in series with a predetermined intermediate section 16 of tertiary coil 9. The coil section 16 is provided by tapping the secondary circuit leads 17 and 18 to respective spaced points 19 and 20 on coil 9. The secondary resonant circuit 13, composed of coil 14, condenser 15 and coil section 16, is tuned to the operating I. F. value of 10.7 mc.

The primary resonant circuit 12 is arranged in circuit with anode 21 of driver tube 2. The connections of the I. F. driver stage are entirely conventional, and need not be described in detail. The primary and secondary circuits 12 and 13 are magnetically coupled, but they are shielded by any suitable shielding device 5 from electric or magnetic coupling with the tertiary circuit 11. The shield 6 similarly shields circuit 11 from the primary and secondary circuits. Hence, the I. F. signal voltages are injected into the tertiary circuit 11 at coil section 16. The resonant frequencies of the circuits 12, 13 and 11 are adjusted by respective powdered iron cores or slugs 7′, 14′ and 9′ of the respective inductances 7, 14, and 9. Core 16′ adjusts the electrical center of inductance 9, and is located in proximity to coil section 16.

Before describing in detail the electrical relations existing between the elements of the discriminator input system, the rectifier circuits will be described. However, the description of these circuits will be quite general, since they are fully described in the aforesaid Seeley application. Rectifiers $D_1$ and $D_2$ are shown, by way of specific example, as electron discharge devices of the diode type. It is to be clearly understood that the diodes may have their electrodes embodied in separate tube envelopes, instead of being embodied in one envelope as in the 6H6 type tube. The cathode 20′ of diode $D_1$ is connected to the upper terminal, as diagrammatically shown, of condenser 10 and to the upper end of coil 9, whereas the anode 21′ of diode $D_2$ is connected to the lower terminal of condenser 10 and to the lower end of coil 9. The anode 22 of diode $D_1$ and the cathode 23 of diode $D_2$ are directly connected by condenser 24. The cathode 23 and the corresponding terminal of condenser 24 are established at ground potential for direct current. The magnitude of the condenser 24 is chosen so that the anode 22 of diode $D_1$ is at ground potential with respect to modulation frequencies i. e., audio frequency, as well as for I. F. Grounding this point provides a negative voltage at the anode of diode $D_1$ which may be used for automatic gain control.

The anode 22 of diode $D_1$ is connected to grounded cathode 23 by a pair of series-arranged condensers 25 and 26. Each of these condensers 25 and 26 has a relatively low impedance to I. F. currents, and they function as I. F. bypass condensers. These condensers may, also, serve to provide the proper amount of de-emphasis in the audio signal, if they have the proper reactance to audio frequency currents. The secondary coil 14 has its low potential end or terminal connected by lead 27 to the junction 33 of condensers 25 and 26. Hence, the lower end or terminal of coil 14 is at ground potential for I. F. currents, since the condenser 26 connects it to ground.

It can be seen that the diodes $D_1$ and $D_2$ are arranged in reverse relation relative to the connection in a conventional FM detector circuit of the type employing balanced detector circuit diodes. The detector circuit is completed by a resistor 28 shunted by condenser 24. The modulation voltage, in this case the desired audio frequency modulation signal voltage, is taken off by connecting an audio output lead to the low I. F. potential end of coil 14, i. e., the junction point 33 of condensers 25 and 26. Condenser 29 is an audio frequency coupling condenser, and is inserted in series to ground with potentiometer resistor 30. The slider 31 of the latter is adapted to be connected to the input grid of the following audio frequency amplifier tube (not shown). Of course, one or more audio amplifier tubes may be employed, and the amplifier audio frequency signals may be reproduced in any suitable manner, as by a loudspeaker.

If no direct current path is connected from point 33 to point 32, or if the impedance of that path is very high compared to the load resistor 28, the direct current through the two diodes $D_1$ and $D_2$ is forced to be equal, regardless of whether the received FM signal is accurately tuned in or is off resonance. This action provides substantial noise reduction. The present FM detector circuit has but a single direct current path connecting the diode rectifiers in series-aiding polarity. Thus, resistor 28 is included in such a path. The resistor is shunted by a condenser (capacity 24) which acts to inhibit changes in the voltage drop across resistor 28 at a modulation frequency rate. This ratio detector is found to be substantially immune to amplitude variations of the FM signals at circuit 12.

There will now be explained the manner in which the discriminator input network of the detector functions. It is to be understood, however, that the input network may be used with a balanced FM detector of the type shown by S. W. Seeley in U. S. Patent No. 2,121,103 granted June 21, 1938. It is first assumed that the FM signals applied to the primary circuit 12 are instantaneously at the mean or carrier frequency of 10.7 mc. Since the secondary circuit 13 is magnetically coupled to primary circuit 12 and is tuned to the same frequency (10.7 mc.) as the latter, there will occur a selective transfer of the I. F. signals from the primary circuit to tertiary resonant circuit 11. The I. F. signal voltage is exclusively injected into the tertiary circuit at the substantially single turn coil section 16 which in Fig. 1 is shown greatly magnified, by virtue of the fact that coil 9 is completely shielded from circuits 12 and 13.

Coil section 16 acts in the manner of a phase shifter element between circuits 13 and 11, and introduces a phase shift of 90 degrees in the I. F. signal voltage transmitted from circuit 13 to tertiary circuit 11 through the mutual inductance of coil section 16. This phase-shifted, or quadrature, voltage is applied in push-pull to the diodes $D_1$ and $D_2$. That is, the phase-shifted voltages applied to each of diodes $D_1$ and $D_2$ are in phase opposition relative to the electrical center point fixed by adjusting core 16'. Adjustment of the latter fixes the electrical center of coil 9.

The direct input voltage to coil 9 is applied by direct connection at the two taps 19 and 20 on coil 9 leading from the circuit 13. The total inductance in circuit 13 is comprised of coils 14 and 16 in series. Since coil 16 (the inductance between taps 19 and 20 of coil 9) is normally very small compared with coil 14, and also with coil 9, the arrangement is substantially a direct conductive connection from the high potential end of circuit 13 to the mid-tap of coil 9. Since section 16 of coil 9 is common to both circuits 13 and 11, and the resonant currents of both circuits 13 and 11 flow through this section, it acts as a common coupling inductance for the two circuits. The arrangement is similar to a normal T configuration for common inductance coupling of doube-tuned band pass filters. The voltages induced in circuit 11 may be considered as secondary voltages obtained by inductance coupling from circuit 13, the primary as far as circuit 11 is concerned. Since both circuits 13 and 11 are tuned to the same frequency, the normal 90° phase relation exists between the primary and secondary voltages at resonance.

Push-push voltages result, therefore, from the direct electrical connection between the high potential end of circuit 13 and the mid-tap of the coil 16 in circuit 11 as explained above. The push-pull voltages result from the coupled, or induced, voltages in coil 9, and are obtained by connections to the opposite ends of coil 9 when operating as a secondary of a coupled circuit as explained above.

The spaced taps 19 and 20, as explained, provide the common coupling inductance between circuits 13 and 11. The magnitude of the inductance 16 between the taps 19 and 20, relative to the magnitudes of coils 14 and 9, determines the degree of coupling between circuits 13 and 11. The coefficient of coupling increases with increasing values of common inductance, as in a T configuration for band pass filters. The percentage coupling between coils 7 and 14 may be about 5%. The percentage coupling between coils 14 and 9, provided by coil section 16, may be about 2%.

In Fig. 2 there is shown a section through coil 9 showing coil 9 with the taps and cores depicted in their relative positions. It will be noted that the taps do not occur at the physical center of the winding 9. They are located for example 9¾ turns and 11⅓ turns from the two ends. The presence of the inductance adjusting core 9' in the short end of the winding compensates this apparent unbalance. The core 16' is in alignment with core 9' within the coil from F. The coil 9 is wound on the external surface of the form. The distance between taps 19 and 20 is about 1½ turns. Core 16' is longer than coil section 16. Further, movement of core 16' does not affect the inductance of section 16 or its coupling to coil 9.

It will now be seen that each diode $D_1$ and $D_2$ has a pair of I. F. signal voltages in phase quadrature applied thereto at resonance. It follows, then that the resultant I. F. signal voltages applied to cathode 20' and anode 21' will be equal at the I. F. value, and the rectified voltages will be of equal magnitude. If, at some later instant, the I. F. signal energy has a frequency different from the resonant frequency of circuit 11, there occurs a phase shift of the signal energy transmitted through the coil section 16 which is greater or less than 90 degrees depending on the direction and extent of frequency difference between the instantaneous frequency of the FM signals and the predetermined resonant frequency of the tuned circuits 12, 13 and 11. This means that there will be applied to the diodes $D_1$ and $D_2$ resultant signal voltages of different magnitudes, and, therefore, the rectified voltages will be of different magnitudes.

It will be observed that my invention makes it possible to use iron cores for adjusting the three tuned inductances 7, 14 and 9 of the discriminator input circuit. Further, the auxiliary iron core 16′ permits adjustment of the electrical center of the tapped third inductance 9 thereby to secure a symmetrical response while using a conventional double-ended transformer construction. Core 9′, located at one end of the winding 9, functions to adjust the value of the inductance of coil 9 for correct tuning.

The cascaded circuits 12, 13 and 11 provide maximum sensitivity and selectivity. Since circuits 13 and 11 are inherently low "Q" circuits under normal operating conditions due to loading by the relatively low value of the load resistor 28, the addition of another tuned circuit 12 in the plate circuit of the driver tube 2 provides additional selectivity. It, also, provides a means of obtaining a better impedance match between the low "Q" circuit 13 and the driver tube plate impedance. It will be noted that generally circuit 13 serves as a coupling link between the primary circuit 12 and the circuit 11 with signal transfer occurring from coil 7 to coil 14 by magnetic coupling, and from circuit 13 to circuit 11 by the common inductance coupling provided by the section 16 of coil 9. The coefficient of coupling between coil 7 and 14 and between coils 14 and 9 are chosen in combination to provide best sensitivity and linearity across the pass band.

It is pointed out that the junction point 33 between condensers 25 and 26 is connected to coil 14, rather than to coil 7, to avoid the additional phase shift between the tuned circuits 12 and 13 which might otherwise upset the quadrature phase relationship at the diodes. The fact that the direct signal voltage is fed from circuit 13 to coil 9 at taps 19 and 20 might create some unbalance. However, since coil section 16 is such a small portion of coil 9, the unbalance is very small. In actual practice no sign of unbalance is apparent. The embodiment of the electrical center adjusting core 16′ permits compensation of production variations.

It would be possible to locate both cores 9′ and 16′ at the two ends of coil 9. In that case both cores would be adjusted simultaneously for proper tuning and balance of coil 9. This method of locating the cores is not as satisfactory as locating core 16′ approximately in the center of the winding, since both cores have equal effects on tuning ond the operation of adjusting for both tuning and balance is more difficult to perform.

While the arrangement shown in Fig. 1 using spaced taps on coil 9 is the preferred arrangement, there may be situations where the coupling between the secondary circuit 13 and tertiary circuit 11 is entirely capacitative, rather than inductive. In this case the high potential side of circuit 13 is connected by a single tap to the midpoint of coil 9, and this need be the only change in the construction. Fig. 3 shows such a circuit modification. The common impedance in this instance is the difference in capacity to ground from cathode 20′ and from anode 21, which is the unbalance to ground of the two sides of tertiary winding 9. This form of the circuit may be useful where very low coefficients of coupling are desired, and it becomes physically difficult to reduce the value of the coupling provided by coil section 16 to the proper value.

In Fig. 3 the circuit 13 has its coil 14 shunted by condenser 15. The high potential lead 17 is connected to the midpoint 19′ on coil 9. The numeral 40 denotes the common impedance, which is the unbalance to ground of the two sides of winding 9. It will be noted that cores 9′ and 16′ provide, as in Fig. 1, respective adjustment of total inductance of coil 9 and the electrical center of circuit 11. In Fig. 3, therefore, the common impedance path between circuits 13 and 11 is obtained by the single tap 19′ at the electrical center of the coil 9 connected to the high potential junction of the second circuit inductance 14 and capacitance 15. The capacitative unbalance 40 to ground is provided from the opposing ends of inductance 9 causing a portion of the resonant currents of both circuit 13 and circuit 11 to flow through the common capacitive path provided by the unbalance.

While I have indicated and described a system for carrying my invention into effect, it will be apparent to one skilled in the art that my invention is by no means limited to the particular organization shown and described, but that many modifications may be made without departing from the scope of my invention.

What I claim is:

1. A frequency discriminator network comprising a first, a second and a third resonant circuit arranged in cascade, said first circuit having signal input terminals for impressing thereon a frequency modulated wave, said second and third circuit including each an inductor, a tuning capacitor connected to the low potential end of the second circuit inductor, said third circuit having signal output terminals at opposite sides thereof, said first circuit being magnetically coupled to said second circuit, means electrically associated with the third circuit inductor to establish an electrical center point thereon, two taps disposed approximately symmetrically about said electrical center point, a connection from one of said taps to the high potential end of said second circuit inductor, a connection from the other one of said taps to the high potential end of the second circuit capacitor, thereby causing the resonant currents of both said second and third circuits to flow in the portion of said third circuit inductance included between said taps and providing a common coupling impedance for said second and third circuits, and said connections from said taps to said second circuit also providing a conductive connection between the high potential side of said second circuit to said electrical center point.

2. A frequency discriminator network as defined in claim 1 wherein said electrical center establishing means consists of a paramagnetic core disposed in said third circuit inductor and being appreciably shorter than the total winding length of said third circuit inductor, whereby movement of said core about the midpoint to adjust said electrical center produces no appreciable change in the total inductance of said third circuit and thus provides an independent adjustment, and said core being appreciably longer than the spacing between said taps and being nominally located approximately centrally within the spacing between said taps, whereby movement of said core to adjust said electrical center produces no appreciable change in the inductance of the portion of said third circuit inductance included between said taps and no appreciable change in coupling between said tapped portion and the total inductance of said third circuit.

3. A frequency discriminator network as defined in claim 2 wherein the resonant frequency of said third circuit is adjustable by a further paramagnetic core disposed in said third circuit inductor and adjacent to one end thereof.

DONALD MACKEY.

REFERENCES CITED

The following references are of record in the file of this patent:

UNITED STATES PATENTS

| Number | Name | Date |
|---|---|---|
| 1,751,996 | Hansell | Mar. 25, 1930 |
| 2,140,770 | Schofield | Dec. 20, 1938 |
| 2,141,254 | Schaper | Dec. 27, 1938 |
| 2,157,170 | Grundmann | May 9, 1939 |
| 2,204,954 | Anderson | June 18, 1940 |
| 2,210,303 | Poydoroff | Aug. 6, 1940 |
| 2,279,506 | Reid | Apr. 14, 1942 |
| 2,309,481 | Summerhayes | Jan. 26, 1943 |
| 2,400,857 | Turner | May 21, 1946 |
| 2,453,529 | Mittelmann | Nov. 9, 1948 |

FOREIGN PATENTS

| Number | Country | Date |
|---|---|---|
| 843,501 | France | Mar. 27, 1939 |

OTHER REFERENCES

Carson et al., "New Features in Broadcast Receiver Design," pp. 45-50, RCA Review, July 1937. (Copy in Div. 10.)